United States Patent
Birman et al.

(10) Patent No.: US 7,537,353 B2
(45) Date of Patent: May 26, 2009

(54) FLOOD AND BACK LIT INSTRUMENT CLUSTER

(75) Inventors: Vyacheslav B. Birman, Auburn Hills, MI (US); Chay Lee, Boca Raton, FL (US); Richard Sanders, Clarkston, MI (US); Christian Tanguy, Rochester, MI (US); Shirley Yu, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 156 days.

(21) Appl. No.: 11/441,892

(22) Filed: May 26, 2006

(65) Prior Publication Data

US 2006/0285354 A1    Dec. 21, 2006

Related U.S. Application Data

(60) Provisional application No. 60/692,193, filed on Jun. 20, 2005.

(51) Int. Cl.
*G01D 11/28* (2006.01)

(52) U.S. Cl. ............... 362/23; 362/27; 362/509; 362/555; 362/558; 362/582; 116/286; 116/287; 116/310

(58) Field of Classification Search ............ 362/23, 362/28, 29, 602, 555, 558, 582; 116/286, 116/287, 310
See application file for complete search history.

(56) References Cited

U.S. PATENT DOCUMENTS

| | | | | |
|---|---|---|---|---|
| 5,406,303 | A * | 4/1995 | Salmon et al. | 345/75.1 |
| 6,036,327 | A * | 3/2000 | Blonder et al. | 362/611 |
| 6,663,252 | B1 * | 12/2003 | Fong et al. | 362/29 |
| 2004/0257790 | A1 | 12/2004 | Tanaka et al. | |
| 2006/0215387 | A1 * | 9/2006 | Wang et al. | 362/29 |

OTHER PUBLICATIONS

International Search Report dated Dec. 14, 2006.

* cited by examiner

*Primary Examiner*—Sandra L O'Shea
*Assistant Examiner*—Jessica L McMillan

(57) ABSTRACT

An instrument cluster assembly includes an outer gauge that is disposed about an inner gauge. The inner gauge is flood lit and the outer gauge is back lit. A single light guide assembly receives light from a plurality of light source exposed about an outer perimeter of the outer gauge. Light directed through the light guide is emitted through a light emitting edge to illuminate the inner gauge. Light traveling from the light source through the light guide is uniformly transmitted through a curved transition portion to back light the outer gauge assembly.

19 Claims, 2 Drawing Sheets

FLOOD AND BACK LIT INSTRUMENT CLUSTER

CROSS REFERENCE TO RELATED APPLICATION

The application claims priority to U.S. Provisional Application No. 60/692,193 which was filed on Jun. 20, 2005.

BACKGROUND OF THE INVENTION

This invention generally relates to a lighting device for an instrument cluster. More particularly, this invention relates to a lighting device for flood lighting and back lighting an instrument cluster.

Conventional instrument clusters are lit by either lighting from behind a semi-transparent surface or directed light onto the surface desired to be lit. Each method is advantageous for specific applications. A flood light lighting configuration provides light onto a surface that can be controlled as desired. The back light configuration provides an aesthetically desired appearance.

A flood lit configuration will typically include a light guide or housing that blocks light in undesired directions such that light from a light source is directed over a surface of an instrument dial or cluster. The back lit configuration typically includes a light source disposed behind a semi-transparent surface. The light source is typically disposed adjacent the surface and within a housing to prevent light from leaking into undesired areas.

As appreciated, the different lighting configurations require different devices, light sources and housing configurations to manage and direct light as is desired. For these reasons, a flood lit and backlit display is difficult and not cost effective to integrate into a single instrument cluster arrangement. Further, utilization of both a flood lit configuration and a back lit configuration require separate light sources that undesirably increase the cost and complexity of an instrument cluster.

Additionally, conventional lighting devices transmit light through straight sections of light guides that are connected at an angular intersection. The angular intersection or joints generate a bright spot or line that is much brighter than the remainder of the light guide. The over illuminated spot of the light guide is undesirable as it provides a very non-uniform appearance. Accordingly, the transition portion is typically blocked from view, essentially wasting much of the emitted light. Additional or larger light sources are then required to compensate for the wasted light.

Accordingly, it is desirable to develop a light configuration that provides both a back lit and flood lit instrument cluster arrangement, and can be utilized for lighting combined instrument gauge cluster assemblies.

SUMMARY OF THE INVENTION

An example instrument cluster includes an inner gauge and an outer gauge where the inner gauge is flood lit and the outer gauge is back lit. The inner gauge and outer gauge are lit by a signal light guide assembly that receives light from a plurality of light sources disposed about a perimeter of the outer gauge assembly.

An example instrument cluster includes a light guide that receives light from a plurality of light sources disposed about a perimeter of an outer gauge. The light guide includes a light receiving surface within which light is transmitted into the light guide. The light guide also includes a light emitting edge that directs light from the plurality of light sources across and onto a center gauge. Between the light receiving surface and the light emitting edge is a transition portion. This transition portion is a curved shape that is uniformly illuminated and that emits light upwardly onto a back side surface of the outer gauge for backlighting the outer gauge assembly.

Accordingly, the light configuration for the example instrument cluster provides the combined lighting of inner and outer gauges in a simple, easily assembled configuration. Further, the curved transition portion provides a uniform distribution of illumination that provides for the efficient use of available light.

These and other features of the present invention can be best understood from the following specification and drawings, the following of which is a brief description.

DETAILED DESCRIPTION OF THE PREFERRED EMBODIMENT

Figure 1:
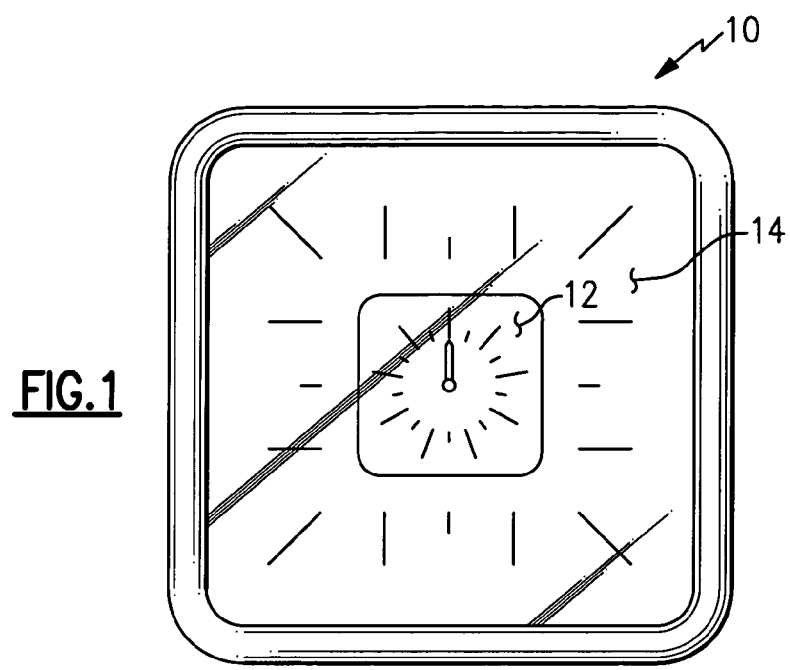
FIG. 1 is a front view of an example instrument cluster.

Referring to FIG. 1, an instrument cluster assembly 10 includes an inner gauge 12 and an outer gauge 14. The inner gauge 12 includes a plurality or series of marks that indicate graduations or of some vehicle operating parameter such as vehicle speed or engine rpm. The outer gauge 14 also includes a plurality of markings that are utilized to indicate another vehicle operating parameter. The outer gauge 14 may also provide a surface for other aesthetic features of the instrument cluster. Lighting of the instrument cluster assembly 10 is provided such that the inner gauge assembly 12 is flood lit and the outer gauge 14 is back lit. Flood lit refers to lighting that is directed across and onto the gauge assembly 12. Light is not emitted from beneath the gauge surface 12. Back lit refers to light that is emitted from an underside of the outer gauge assembly 14. The outer gauge assembly 14 includes a transparent material that allows a desired portion of light to be transmitted there through to provide the desired backlight effect. Further, the outer gauge 14 may include a surface having only specific locations open to the transmission of light and other that block light such that only desired features of the outer gauge 14 are illuminated.

Figure 2:
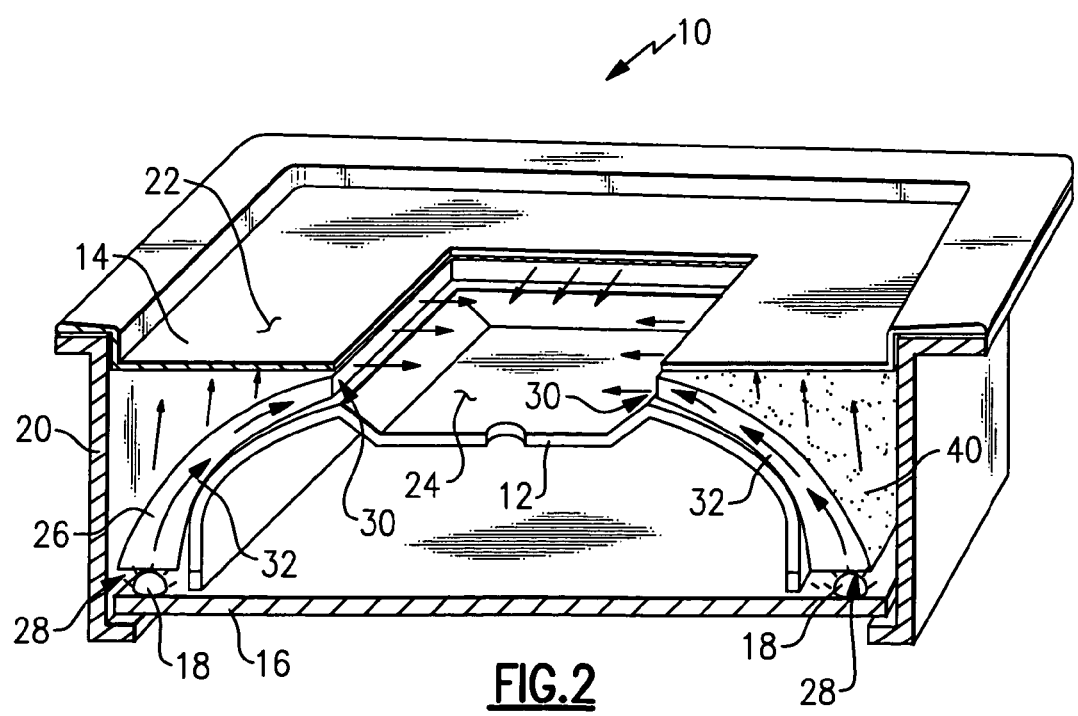
FIG. 2 is a cross-sectional cut away view of the example instrument cluster assembly.

Referring to FIG. 2, the inner gauge assembly 12 and the outer gauge assembly 14 are mounted within a housing 20. The housing 20 provides support for the gauge assembly 10 and also provides a light blocking feature to prevent intrusion of light to undesired areas.

A circuit board 16 is disposed within the housing 20 and supports a plurality of light sources 18. The example light sources 18 comprise a plurality of light emitting diodes LED, however other know light sources are also within the contemplation of this invention. Light emitted from the LEDs 18 is directed through a light guide 26. The light guide 26 provides light to both the inner gauge assembly 12 and the outer gauge assembly 14.

The light guide 26 includes a light receiving surface 28 that receives light from each of the adjacently disposed and mounted LEDs 18. Light transmitted and received into the light guide 26 is directed upwardly and outwardly through a light emitting edge 30. The light emitting edge 30 is disposed transverse relative to the light receiving surface 28. Between the light receiving surface 28 and the light emitting edge 30 is a transition portion 32.

The transition portion 32 is curved to uniformly direct light from the light receiving surface 28 to the light emitting edge 30 to flood light surface 24 of the inner gauge assembly 12. The transition portion 32 directs light from a first plane defined by the circuit board 16, and a second plane defined by the face 24 of the inner gauge 12. The transition portion 32 defines a curvilinear plane between the circuit board 16 and the inner gauge face 24. The curvilinear plane is not interrupted by joints or other intersections that may cause bright non-uniform spots. Instead, the curvilinear plane of the transition portion provides a substantially uniform illumination that does not require blocking and is suitable for use in illuminating a portion of the gauge assembly 10.

The transition portion 32 includes a surface region 40 that emits light upwardly against a back surface of the outer gauge assembly 14. The outer gauge assembly 14 is comprised of a translucent or transparent material through which light passes to illuminate a face 22 of the outer gauge assembly 14 in a desired manner.

The transition portion 32 of the light guide assembly 26 utilizes light that would otherwise require blocking to prevent undesired light leakage. As appreciated, in prior art devices light transmitted from the light source 18 to a light emitting edge 30 required some light blocking or other masking device to prevent the overly bright non-uniform light from being visible. As appreciated, blocking light reduces the efficiency of the light source and therefore required additional lights to provide the desired illumination levels.

The example light guide 26 provides a uniformly illuminated transition portion 32 without intersections that generated undesirable bright spots that required blocking and reduced the efficient use of available light. The use of all the light increases the efficient use a light source to provide for a reduction in the number of LEDs 18 required for a desired illumination level.

Figure 3:
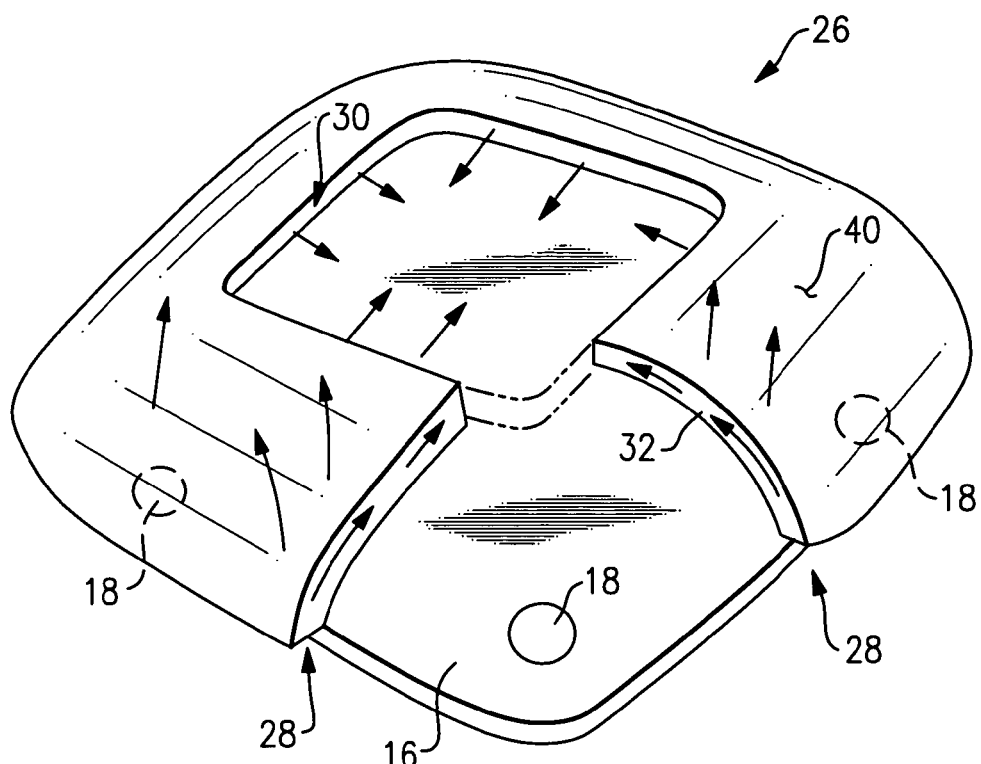
FIG. 3 is a partial cut away view of an example light guide assembly.
Figure 4:
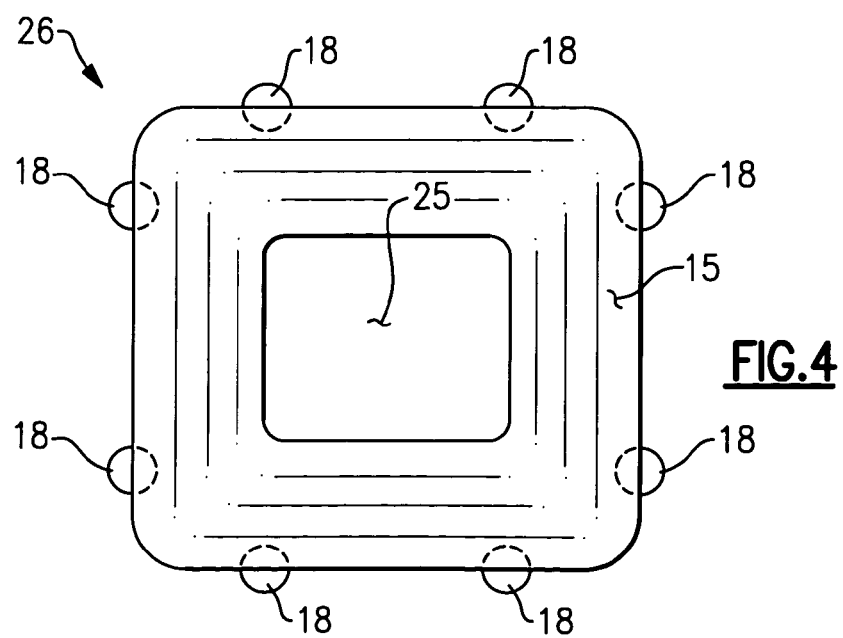
FIG. 4 is a top view of the light guide assembly.

Referring to FIGS. 3 and 4, the light guide 26 is shown removed from the housing 20 and without the inner and outer gauge assemblies 12, 14. The LED 18 is shown mounted to the circuit board 16. The example light guide 26 is essentially square shaped with rounded corners providing a smoothly transitioned curve from the surface of the circuit board 16 to the light emitting edge 30 that is disposed transverse to the surface of the circuit board 16. The transition portion 32 is curvilinear to uniformly transmit and direct light as desired.

Light traveling through the light guide 26 is transmitted through the surface region 40 of the transition portion 32 to transmit or leak a portion of light that is not transmitted onto the inner gauge assembly 12. The amount of light that is emitted from the transition portion 32 is determined based on the curvature of the light guide and the angle of the edge of both the light emitting edge 30 and the light receiving surface 28. By varying the curvature and angle of the edges of the light guide assembly 26, the desired amount of light transmitted through the transition portion 32 for backlighting the outer gauge assembly 14 can be controlled. Further, by varying the curvature or arc in the transition portion 32 of the light guide 26 the maximum and minimum illumination or contrast between the backlighting of the outer gauge assembly 14 and the flood lighting of the inner gauge assembly 12 can be controlled to provide a desired aesthetic appearance of the gauge assembly 10.

Referring to FIG. 4, a top view of a light guide assembly 26 illustrating a relative position of each of the LEDs 18 around the light guide assembly 26. In the illustrated example, eight LEDs 18 are utilized for illuminating the gauge assembly 10 and transmit light through the light guide assembly 26. The number of light sources 18 is dependent on the desired illumination levels for both the flood lighting application required to illuminate the inner gauge assembly 12 and the backlit outer gauge assembly 14. Further, the transition portion 32 can be textured to even out illumination transmitted through the surface region 40.

The example light guide assembly according to this invention provides for the simplification and more efficient use of light for illuminating both an inner gauge and an outer gauge assembly. Further, the curved transition portion generates a uniform illumination that can be utilized for illumination to efficiently utilize all available light.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An instrument cluster assembly comprising:
   an outer instrument surface disposed at least partially about an inner instrument surface; and
   a light guide assembly including a light receiving surface, a transition portion comprising a continuous curved surface and a light emitting edge, wherein the light emitting edge illuminates the inner instrument surface and the transition portion illuminates the outer instrument surface.

2. The assembly as recited in claim 1, wherein the light receiving surface is disposed transverse to the light emitting edge and the transition portion directs light from the light receiving surface through to the light emitting edge.

3. The assembly as recited in claim 2, including a plurality of light sources disposed adjacent the light receiving surface.

4. The assembly as recited in claim 2, wherein the transition portion includes a textured surface.

5. The assembly as recited in claim 1, wherein the outer instrument surface is backlit.

6. The assembly as recited in claim 1, wherein the light guide is substantially square shaped with rounded corners.

7. The assembly as recited in claim 6, wherein the transition portion includes a continuous curved surface through which light is transmitted for illuminating the outer instrument surface.

8. The assembly as recited in claim 1, wherein the transition portion comprises a continuous curvilinear shape that provides a uniform illumination.

9. An instrument illuminating assembly comprising:
   a light guide including a light receiving surface and a light emitting edge and a light emitting surface, wherein the light emitting edge directs light over an inner surface and the light emitting surface directs light to an outer surface; and
   a light source disposed adjacent the light receiving surface to provide light to both light emitting edge and the light emitting surface.

10. The assembly as recited in claim 9, wherein the light transmitting edge comprises an edge disposed transverse to the light receiving surface.

11. The assembly as recited in claim 10, wherein the light transmitting surface comprises a continuous curved surface disposed between the light receiving surface and the light receiving edge.

12. The assembly as recited in claim 11, wherein the curved surface comprises a texture for projecting a desired level of illumination.

13. The assembly as recited in claim 11, wherein the curved surface includes an arc that provides for uniform transmission of a desired level of illumination through the light emitting edge and the light emitting surface.

14. The assembly as recited in claim 9, wherein the light receiving surface is disposed on a first plane and the light emitting edge is disposed on a second plane transverse to the first plane, and the light emitting surface is disposed on a curvilinear plane extending between the first plane and the second plane.

15. The assembly as recited in claim 9, wherein the inner surface comprises an inner gauge face and the outer surface comprises an outer gauge face.

16. The assembly as recited in claim 9, wherein the light source comprises a light emitting diode mounted to a circuit board.

17. An instrument illuminating assembly comprising:
a light source; and
a light guide including a light receiving surface through which light from the light source is received within the light guide and is directed through a light emitting surface that emits a first portion of light from the light guide in a first direction and transmits a second portion of light to a light emitting edge where the second portion of light is emitted in a second direction different than the first direction.

18. The assembly as recited in claim 17, wherein the light receiving surface is disposed transverse to the light emitting edge and the second direction is transverse to the light receiving surface.

19. The assembly as recited in claim 17, wherein the light emitting surface comprises a curved surface for emitting the first portion of light from the light guide in a direction transverse to the light emitting edge.

* * * * *